US012780748B2

(12) United States Patent
Lee et al.

(10) Patent No.: US 12,780,748 B2
(45) Date of Patent: Nov. 3, 2026

(54) SYSTEM AND METHOD FOR STEAM CURING AND CARBONATION CURING PRECAST CONCRETE

(71) Applicant: KOREA ADVANCED INSTITUTE OF SCIENCE AND TECHNOLOGY, Daejeon (KR)

(72) Inventors: Haeng-Ki Lee, Daejeon (KR); JiHoon Park, Daejeon (KR); Alam Cho, Daejeon (KR); Naru Kim, Daejeon (KR); Daelk Jang, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 357 days.

(21) Appl. No.: 18/392,381

(22) Filed: Dec. 21, 2023

(65) Prior Publication Data

US 2024/0254059 A1 Aug. 1, 2024

(30) Foreign Application Priority Data

Feb. 1, 2023 (KR) ........................ 10-2023-0013461

(51) Int. Cl.
*C04B 40/02* (2006.01)
*B28B 11/24* (2006.01)

(52) U.S. Cl.
CPC ........ *C04B 40/0236* (2013.01); *B28B 11/245* (2013.01); *C04B 40/0231* (2013.01); *C04B 40/024* (2013.01)

(58) Field of Classification Search
None
See application file for complete search history.

(56) References Cited

FOREIGN PATENT DOCUMENTS

| | | |
|---|---|---|
| JP | 2022124416 A | 8/2022 |
| KR | 101619320 B1 | 5/2016 |

OTHER PUBLICATIONS

KR101619320B1 Lee English Translation 2015 (Year: 2015).*
JP2022124416A Okoshi English Translation 2022 (Year: 2022).*
Office Action issued on Apr. 16, 2025, in corresponding Korean Application No. 10-2023-0013461, 11 pages.

* cited by examiner

*Primary Examiner* — Jacob T Minskey
*Assistant Examiner* — Adrien J Bernard
(74) *Attorney, Agent, or Firm* — Maier & Maier, PLLC

(57) ABSTRACT

A system and method for steam curing and carbonation curing precast concrete, including: a steam curing tank forming a steam curing space; a carbonation curing tank disposed within the steam curing space and forming a carbonation curing space; a mold disposed within the carbonation curing space and forming a concrete shaping space by a plurality of segments; and a demolding device configured to separate the plurality of segments from one another to open the concrete shaping space.

17 Claims, 5 Drawing Sheets

SYSTEM AND METHOD FOR STEAM CURING AND CARBONATION CURING PRECAST CONCRETE

TECHNICAL FIELD

The present disclosure relates to a system and a method for steam curing and carbonation curing precast concrete.

BACKGROUND

Concrete is a cement composite material made by mixing aggregates and water with cement, and is the most widely used construction material, along with steel, for building structures such as buildings, bridges, dams, ports, tunnels, etc.

Precast concrete is a concrete product manufactured and supplied in a factory with a predetermined shape, offering advantages such as time saving, cost reduction, ease of quality control, increased durability in construction, among others.

Precast concrete is typically manufactured by pouring concrete into a mold and then transferring it to a hot and humid curing chamber for a steam curing process.

Moreover, various curing methods are actively studied to enhance the strength and durability of precast concrete. Among these, carbonation curing is known as an environmentally friendly technology that exposes concrete to high concentrations of carbon dioxide in the early stages of curing, effectively improving the strength of concrete products.

However, conventional carbonation curing involves removing the concrete product from the mold and transferring the removed concrete product to a carbonation chamber for curing, which consumes a significant amount of time and cost and faces spatial constraints such as the size and number of carbonation curable products.

Furthermore, as disclosed in KR Patent No. 10-1619320, in the case where the concrete products were removed from the mold and transferred to the carbonation curing chamber before being completely cured in order to increase the efficiency of carbonation curing, the incompletely cured concrete products could be potentially damaged during the transportation.

In addition, while the steam required for high-temperature steam curing of precast concrete is commonly produced by a boiler, a large amount of carbon dioxide is generated during the production of steam using the boiler.

KR Patent No. 10-1619320, published on May 10, 2016, discloses a "Cement Product Manufacture Method Using $CO_2$ Curing."

SUMMARY

Embodiments of the present disclosure provide a system and a method for steam curing and carbonation curing precast concrete that can steam cure and carbonation cure precast concrete in place without transporting precast concrete after having removed precast concrete from a mold.

An aspect of the present disclosure may provide a system for steam curing and carbonation curing precast concrete, including: a steam curing tank forming a steam curing space; a carbonation curing tank disposed within the steam curing space and forming a carbonation curing space; a mold disposed within the carbonation curing space and forming a concrete shaping space by a plurality of segments; and a demolding device configured to separate the plurality of segments from one another to open the concrete shaping space.

The plurality of segments may form a gap through which carbon dioxide injected into the carbonation curing space may flow into the concrete shaping space as each of the plurality of segments is pulled toward an inner surface of the carbonation curing tank by the demolding device.

The demolding device may include: a first magnet being coupled, respectively, to the plurality of segments; and a first shuttering magnet being coupled to the carbonation curing tank and generating a magnetic force of opposite polarity to the first magnet.

The system may further include a pressurizing device configured to press each of the plurality of segments in a direction away from the inner surface of the carbonation curing tank to prevent the concrete shaping space from arbitrarily being opened due to the plurality of segments being pushed towards the inner surface of the carbonation curing tank by a concrete casting pressure, wherein the pressurizing device may include a second magnet being coupled, respectively, to the plurality of segments and a second shuttering magnet being coupled to the carbonation curing tank and generating a magnetic force of the same polarity as the second magnet.

The system further includes a power generation unit configured to supply power required for driving the demolding device and the pressurizing device, wherein the power generation unit may be configured to generate power using the pressure of steam injected into the steam curing space.

The power generation unit may include a collision plate facing a steam injection port within the steam curing space and a piezoelectric element arranged on the collision plate.

The system may further include: a boiler; a steam injection unit configured to inject steam produced by the boiler into the steam curing space; and a carbon dioxide injection unit configured to inject carbon dioxide into the carbonation curing space.

The carbon dioxide injection unit may include a carbon dioxide collector configured to separate carbon dioxide from the exhaust gas of the boiler and a carbon dioxide storage tank configured to temporarily store carbon dioxide separated from the carbon dioxide collector.

The carbon dioxide injection unit may further include a carbon dioxide recovery line configured to recover carbon dioxide from the carbonation curing tank and store the recovered carbon dioxide in the carbon dioxide storage tank.

The system may further include a control unit configured to control the demolding device, the steam injection unit and the carbon dioxide injection unit, wherein the control unit may drive the steam injection unit to initiate steam curing and then drive the demolding device and the carbon dioxide injection unit to initiate carbonation to initiate carbonation curing.

The control unit may initiate carbonation curing after a predetermined time has elapsed after initiating steam curing, the predetermined time being a time sufficient to develop a minimum strength for retaining the shape in precast concrete.

The carbonation curing tank may include a container and a lid configured to open and close an opened top surface of the container, wherein the plurality of segments may include a plurality of first segments coupled to the container and configured to partition lateral surfaces of the concrete shaping space and a second segment coupled to the lid and configured to partition a top surface of the concrete shaping space.

The mold may further include a platform disposed on a bottom surface of the container to partition a bottom surface of the concrete shaping space.

The first segments may be provided with first stopper projections at lower ends of the first segments, the first stopper projections being inserted into insertion grooves formed on a lateral surface of the platform.

The second segment may be provided with second stopper projections along edges of the second segment, the second stopper projections being configured to support outer surfaces of the first segments.

The plurality of segments may each be movably coupled to the carbonation curing tank via a buffer spring.

Another aspect of the present disclosure may provide a method for steam curing and carbonation curing precast concrete, comprising: casting pre-prepared concrete into a mold; initiating high-temperature curing by heating a carbonation curing tank enveloping the mold; and initiating carbonation curing by removing the mold and injecting carbon dioxide into the carbonation curing tank.

In the step of initiating carbonation curing, carbonation curing may be initiated when a predetermined time has elapsed after initiating the high-temperature curing, the predetermined time being a time sufficient to develop a minimum strength for retaining the shape in precast concrete.

The mold may include a plurality of segments forming a concrete shaping space in the carbonation curing tank. The plurality of segments may be separated from one another by a demolding device to open the concrete shaping space. The demolding device may include first magnets being coupled, respectively, to the plurality of segments and a first shuttering magnet coupled to the carbonation curing tank and configured to generate a magnetic force opposite to a polarity of the first magnets.

The carbonation curing tank may include a container and a lid configured to open and close an opened top surface of the container, wherein the plurality of segments may include a plurality of first segments coupled to the container and configured to partition lateral surfaces of the concrete shaping space and a second segment coupled to the lid and configured to partition a top surface of the concrete shaping space. In the step of casting pre-prepared concrete, the concrete may be cast into the concrete shaping space through a top surface of the concrete shaping space being opened by separating the lid from the container.

According to embodiments of the present disclosure, it is possible to cure precast concrete in place without transporting the precast concrete after having removed the precast concrete from a mold, thereby improving problems that may arise when transporting the precast concrete for conventional carbonation curing after having removed the precast concrete from a mold.

Moreover, by using carbon dioxide discharged in large quantities from the boiler that produces steam for high-temperature steam curing, it is possible to reduce the amount of carbon dioxide emissions during the manufacturing process of the precast concrete.

DETAILED DESCRIPTION

Figure 1:
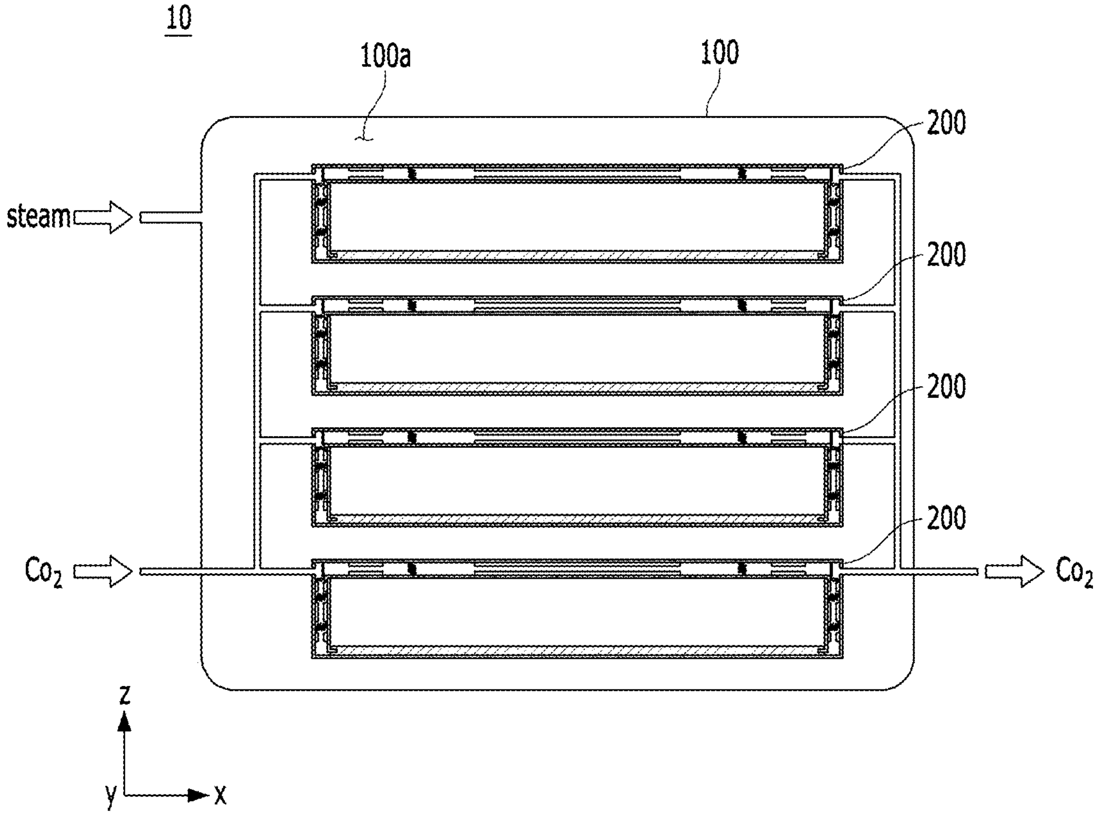
FIG. 1 illustrates a system for steam curing and carbonation curing precast concrete in accordance with an embodiment of the present disclosure.

Hereinafter, certain preferred embodiments of the present disclosure will be described in detail with reference to the accompanied drawings.

Unless otherwise defined, the terms used in the embodiments of the present disclosure may be interpreted to mean the general understanding of a person ordinarily skilled in the art to which the present disclosure pertains, may be deemed to merely describe certain embodiments, and are not intended to limit the present disclosure.

In the present specification, any singular expressions shall be deemed to include plural forms, unless otherwise described. When a component is described to “include” or “comprise” an element, it shall mean that the component may further include another element. Moreover, when it is described to be “on” an element, it shall be appreciated to be above or below said element, and not necessarily above said element in a gravitational direction.

When an element is described to be “connected” or “coupled” to another element, it shall include not only the case of said element directly being connected or coupled to the other element but also the case of said element indirectly being connected or coupled to the other element by way of yet another element. While terms such as “first” and “second” may be used to describe an element, these terms are used solely for the purpose of distinguishing one element from another element and are not intended to define, for example, the nature, order, or sequence of the elements.

Moreover, any description associated with a particular embodiment of the present disclosure may be applied as is or with a partial modification to another embodiment unless such application or modification is outside the technical ideas of the embodiment. In describing various embodiments with reference to the accompanied drawings, identical or corresponding elements will be given identical reference numerals and will not be redundantly described.

Figure 2:
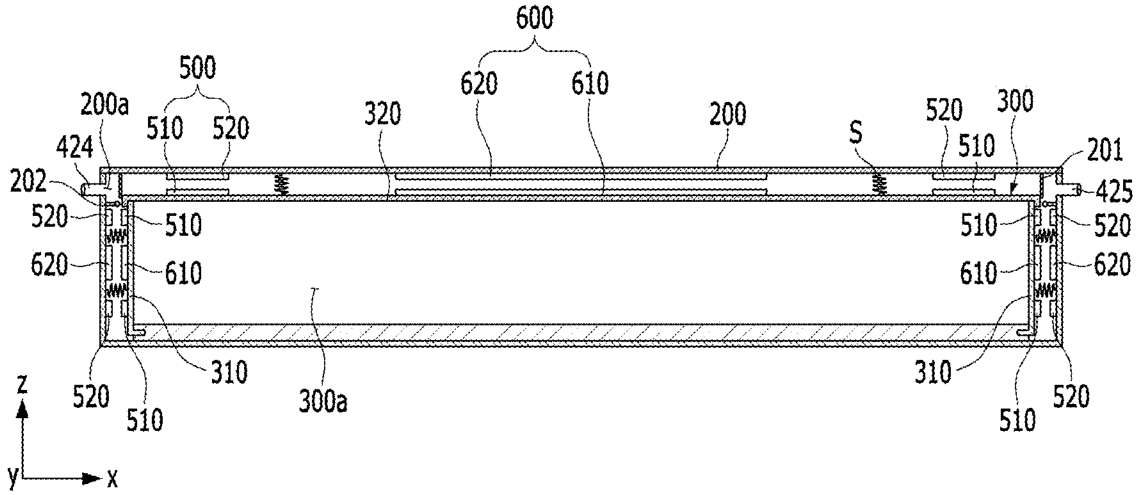
FIG. 2 illustrates a magnified view of the carbonation curing tank shown in FIG. 1.
Figure 3:
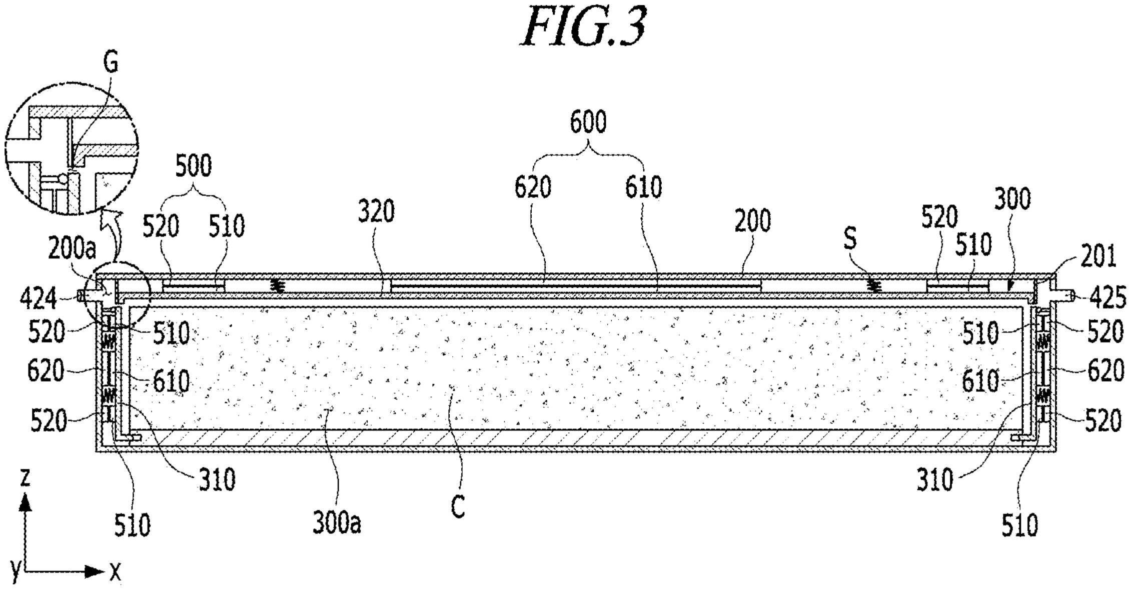
FIG. 3 illustrates an opened state of the mold, pursuant to an activation of the demolding device shown in FIG. 2.

FIG. 1 illustrates a system for steam curing and carbonation curing precast concrete in accordance with an embodiment of the present disclosure. FIG. 2 illustrates a magnified view of the carbonation curing tank shown in FIG. 1. FIG. 3 illustrates an opened state of the mold, pursuant to an activation of the demolding device shown in FIG. 2.

Referring to FIG. 1 to FIG. 3, the system 10 for steam curing and carbonation curing precast concrete in accordance with an embodiment of the present disclosure may include a steam curing tank 100, a carbonation curing tank 200, a mold 300 and a demolding device 500.

The steam curing tank 100 may be formed with a steam curing space 100*a*, which is an internal space where steam is injected. The heat of the steam injected to the steam curing space 100*a* may be transferred to a concrete shaping space 300*a*, which will be described later, to contribute to steam curing.

The carbonation curing tank 200 may be arranged within the steam curing space 100*a* and may be formed with a carbonation curing space 200*a*, which is an internal space where carbon dioxide is injected.

The mold 300 may be arranged within the carbonation curing space 200*a* and provided with a plurality of segments 310, 320 forming the concrete shaping space 300*a*. Here, the concrete shaping space 300*a* may refer to a space in which concrete is cast and shaped into precast concrete C.

The plurality of segments 310, 320 may abut against each other to form the concrete shaping space 300*a*. The plurality of segments 310, 320 may each be movably coupled to the carbonation curing tank 200. For instance, the plurality of segments 310, 320 may each be movably coupled to the carbonation curing tank 200 through a buffer spring S. However, the buffer spring S may not be functionally limited to what is described herein but may be installed for the purpose of preventing collisions or mitigating impacts when the segments move.

The carbonation curing tank 200 may be provided with a guide rail 201 or a stopper 202 for preventing disengagement or limiting displacement when the segments 310, 320 move.

The demolding device 500 may separate the plurality of segments 310, 320 from each other to open the concrete shaping space 300*a*. For example, the plurality of segments 310, 320 may each be pulled toward an inner surface of the carbonation curing tank 200 by the demolding device 500, thereby forming a gap G connecting the carbonation curing space 200*a* and the concrete shaping space 300*a* between the plurality of segments 310, 320. The structure of the demolding device 500 will be described in detail below. As a result, carbon dioxide injected into the carbonation curing space 200*a* may flow into the concrete shaping space 300*a*.

Therefore, the present invention allows precast concrete C to be cured in place without transportation after demolding, thus establishing an efficient system that improves issues that may arise during transportation after demolding for conventional carbonation curing.

Meanwhile, the X-axis direction, Y-axis direction and Z-axis direction indicated in the drawings may represent perpendicular directions to each other, and the Z-axis direction may be, but not limited to, a vertical direction.

Figure 4:
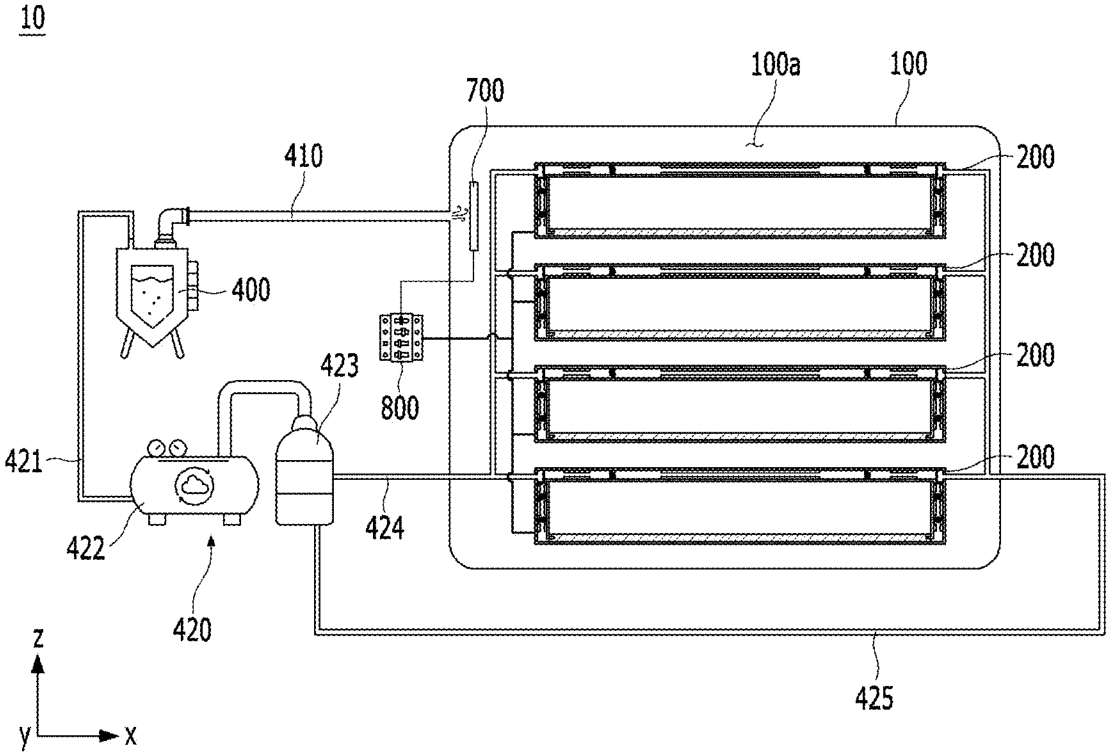
FIG. 4 illustrates a system for steam curing and carbonation curing precast concrete in accordance with another embodiment of the present disclosure.

FIG. 4 illustrates a system for steam curing and carbonation curing precast concrete in accordance with another embodiment of the present disclosure.

Referring to FIG. 2 to FIG. 4, the system 10 for steam curing and carbonation curing precast concrete in accordance with another embodiment of the present disclosure may include a steam curing tank 100, a carbonation curing tank 200, a mold 300 and a demolding device 500, and may further include a boiler 400, a steam injection unit 410, a carbon dioxide injection unit 420, a pressurizing device 600, a power generation unit 700 and/or a control unit 800.

The boiler 400 may be configured to produce steam and may discharge exhaust gas while producing the steam.

The steam injection unit 410 may be configured to inject the steam produced by the boiler 400 into a steam curing space 100*a*. For example, the steam injection unit 410 may include a steam supply pipe connecting the boiler 400 with the steam curing tank 100, as well as a valve and/or pump installed in the steam supply pipe to control the supply of steam.

The carbon dioxide injection unit 420 may be configured to inject carbon dioxide into the carbonation curing space 200*a*. For example, the carbon dioxide injection unit 420 may include an exhaust pipe 421 configured to transport the exhaust gas discharged by the boiler 400, a carbon dioxide collector 422 installed on the exhaust pipe 421 and configured to separate carbon dioxide from the exhaust gas, a carbon dioxide storage tank 423 configured to temporarily store the separated carbon dioxide, and a carbon dioxide supply pipe 424 connecting the carbon dioxide storage tank 423 with the carbonation curing tank 200, wherein the carbon dioxide supply pipe 424 may be installed with a valve and/or pump for controlling the supply of carbon dioxide.

Therefore, the present disclosure can establish an environmentally friendly system that can reduce carbon dioxide emissions in the manufacturing process of precast concrete C by storing the large amount of carbon dioxide emitted from the boiler 400 in the precast concrete C.

Moreover, according to the present disclosure, steam curing and carbonation curing may be performed simultaneously, resulting in densifying the microstructure of precast concrete C with enhanced strength and durability.

Furthermore, while the difficulty in implementing conventional carbonation curing has been mainly due to the difficulty in predicting the concentration of the collected carbon dioxide, which in turn made it difficult to accurately predict the physical properties of concrete products after carbonation curing, the present disclosure has the advantage that the concentration of the collected carbon dioxide is predictable because the boiler is specified as the source of carbon dioxide. However, the source of carbon dioxide is not limited to the boiler 400, and the carbon dioxide injection unit 420 may have carbon dioxide received and injected from a source other than the boiler 400.

The carbon dioxide injection unit 420 may further include a carbon dioxide recovery line 425 configured to recover carbon dioxide from the carbonation curing tank 200 and store the recovered carbon dioxide in the carbon dioxide storage tank 423. For example, the carbon dioxide recovery line 425 may include a carbon dioxide recovery pipe connecting the carbonation curing tank 200 with the carbon dioxide storage tank 423, as well as a valve and/or pump installed on the carbon dioxide recovery pipe to control the recovery of carbon dioxide.

Meanwhile, the carbon dioxide injection unit 420 may perform additional purification processes such as dust collection, desulfurization, cooling purification, and separation after reacting the exhaust gas discharged from the boiler 400 and the remaining carbon dioxide recovered after carbonation curing in the carbonation curing tank 200 with an absorbent solution such as amine-based, amino acid salt, inorganic salt-based solution, ammonia water, metal ion salt solution, etc. Used for an absorbent may be a material that has excellent absorbency of contaminants, readily absorbs moisture, and generates an endothermic reaction during absorption to provide excellent latent heat recovery characteristics for the exhaust gas. The absorbent solution having reacted with carbon dioxide may be separated into carbon dioxide and low-temperature water by passing through a heat exchanger, a dryer and a water treatment tank. The purified carbon dioxide may be used for carbonation curing, and the low-temperature water may be supplied as supplement water for the boiler or reused in the carbon dioxide removal process. The heat generated in this process may be recovered through a heat exchanger for use in dissolving the absorbent replenishment or supplied as a heat source of the boiler.

The demolding device 500 may include a first magnet 510 and a first shuttering magnet 520. However, persons ordinarily skilled in the art shall appreciate that the configuration of the demolding device 500 is not limited to what is described herein and may be implemented using, for example, hydraulic devices, pneumatic devices, and/or gear devices.

The first magnet 510 may be coupled to each of the plurality of segments 310, 320 and may be, for example, a permanent magnet. The first shuttering magnet 420 may be coupled to the carbonation curing tank 200 so as to face the first magnet 510 and may generate/cancel a magnetic force of the opposite polarity to the first magnet 510 depending on an on/off operation of, for example, a switch. Accordingly, when the first shuttering magnet 520 is activated to generate a magnetic force, the first shuttering magnet 520 may attract the first magnet 510, and the plurality of segments 310, 320 may be pulled toward the inner surface of the carbonation curing tank 200.

In the case where the demolding device 500 is configured with the first shuttering magnet 520, the pressurizing device 600 may press each of the plurality of segments 310, 320 in a direction away from the inner surface of the carbonation curing tank 200 to prevent the concrete shaping space 300*a* from being arbitrarily opened by being pushed toward the inner surface of the carbonation curing tank 200 by the concrete casting pressure. The pressurizing device 600 may include a second magnet 610 and a second shuttering magnet 620.

The second magnet 610 may be coupled to each of the plurality of segments 310, 320 and may be, for example, a permanent magnet. The second shuttering magnet 620 may be coupled to the carbonation curing tank 200 so as to face the second magnet 610 and may generate/cancel a magnetic force of the same polarity as the second magnet 610 depending on an on/off operation of, for example, a switch. Accordingly, when the second shuttering magnet 620 is activated to generate a magnetic force, the second shuttering magnet 620 may push the second magnet 610, and the plurality of segments 310, 320 may be pressurized towards the precast concrete C.

The shuttering magnet is a known device that generates/eliminates magnetic forces based on the on/off operation of, for example, a switch. While power may need to be supplied in order to operate the switch, the power does not need to be supplied continuously, once the switch is turned on, in order to maintain the magnetic forces. Therefore, as described below, it is possible to supply the power required for the operation of the shuttering magnet using a power generation unit that utilizes steam pressure. Even after the steam supply is interrupted following the activation of the shuttering magnet, the magnetic forces can still be maintained.

In the present disclosure, the intensity of magnetic forces generated by the shuttering magnet may vary depending on the size of the concrete product intended to be produced, and various shapes of concrete products may be produced by setting or controlling the intensity of the magnetic forces differently for various installation locations.

The power generation unit 700 may produce power required for driving the demolding device 500 and the pressurizing device 600. Particularly, the power generation unit 700 may be configured to generate power using the pressure of the steam injected into the steam curing space 100*a*. Therefore, by using the pressure of the steam injected during the steam curing to generate power, the present disclosure may construct an environmentally friendly system that reduces wasted energy. Meanwhile, the detailed structure of the power generation unit 700 will be described later in detail.

The control unit 800 may control the steam injection unit 410, the carbon dioxide injection unit 420 and the demolding device 500 according to, for example, a manual input signal or a predetermined program. Specifically, the control unit 800 may initiate steam curing by driving the steam injection unit 410 and then initiate carbonation curing by driving the carbon dioxide injection unit 420 and the demolding device 500. Particularly, the control unit 800 may initiate carbonation curing after a predetermined time has elapsed after initiating steam curing, the predetermined time being a time sufficient to develop a minimum strength for retaining the shape in precast concrete C. Therefore, the initial stage of carbonation curing may be performed after the minimum strength for retaining the shape of the precast concrete C is achieved through stream curing, and carbonation curing is performed in a high-temperature state in which the precast concrete C is not completely solidified, thereby resulting in an excellent efficiency of carbonation curing.

Meanwhile, the control unit 800 may control the pressurizing device 60 in conjunction with the demolding device 600. For example, the control unit 800 may stop the pressurizing device 600 when the demolding device 500 is operated. Specifically, when a magnetic force is generated by the first shuttering magnet 520, the magnetic force generated by the second shuttering magnet 620 may be controlled to be canceled.

Figure 5:
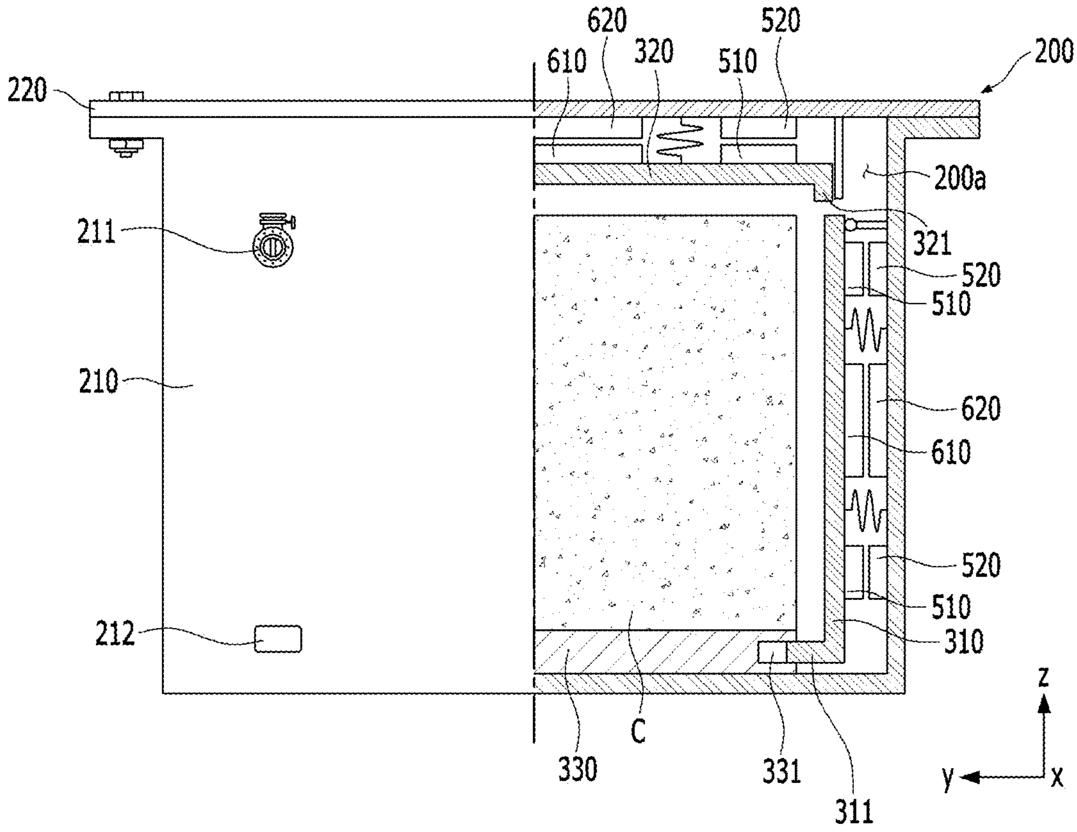
FIG. 5 is a partial sectional view illustrating the carbonation curing tank of FIG. 3 shown in a different direction.

FIG. 5 is a partial sectional view illustrating the carbonation curing tank of FIG. 3 shown in a different direction. Referring to FIG. 5, the carbonation curing tank 200 may include a container 210 and a lid 220. The container 210 may have a shape with a top surface thereof open and partition lateral surfaces and a bottom surface of the carbonation curing space 200*a*. The lid 220 may be removably coupled to the container 210 through a fastening member such as a bolt to open and close the open top surface of the container 210.

The plurality of segments 310, 320 may include a plurality of first segments 310 and a second segment 320. The plurality of first segments 310 may each be coupled to the container 210 of the carbonation curing tank 200 to partition lateral surfaces of the concrete shaping space 300*a*, and the second segment 320 may be coupled to the lid 220 of the carbonation curing tank 200 to partition a top surface of the concrete shaping space 300*a*.

Therefore, when the lid 220 is separated from the container 210, the top surface of the concrete shaping space 300*a* may be opened, and concrete may be poured into the concrete shaping space 300*a* through the opened top surface of the concrete shaping space 300*a*. In such a case, the concrete casting task may be undertaken by, but not limited to, a worker or a concrete casting device being deployed into the steam curing tank 100. To this end, the steam curing tank 100 may be provided with an entrance, through which the worker may enter and exit, the concrete casting device may be brought in, or the manufactured precast concrete C may be brought out.

The mold 300 may further include a platform 330 placed on the bottom surface of the container 210 to partition a bottom surface of the concrete shaping space 300*a*. The platform 330 may be fixed in the container 210, and an insertion groove 331 may be formed at lateral surfaces of the platform 330.

The first segments 310 may be provided with a first stopper projection 311, which is inserted into the insertion groove 331, at the bottom thereof. The second segment 310 may be provided with a second stopper projection 321, which supports outside surfaces of the first segments 310, along a boundary of the second segment 320. Accordingly, the first segments 310 and the second segment 320 may maintain a firmly fixed state.

Meanwhile, reference numeral 211 shown in FIG. 5 but not described herein may refer to a carbon dioxide inlet, to which the carbon dioxide supply pipe 424 is connected, and reference numeral 212 may refer to a power cable socket configured for supplying electric power to the shuttering magnets 620, 620.

Figure 6:
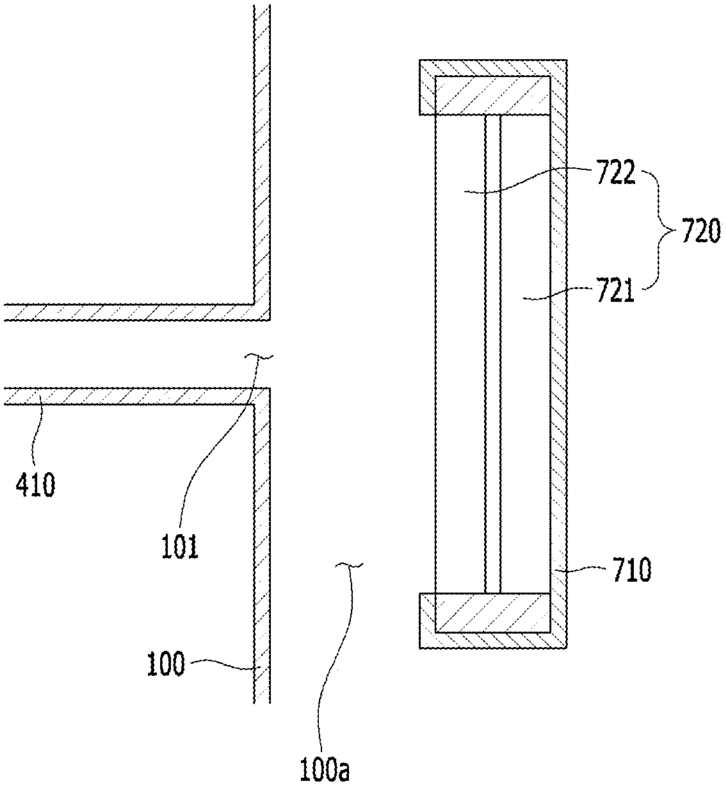
FIG. 6 illustrates a magnified view of the power generation unit shown in FIG. 4.
Figure 7:
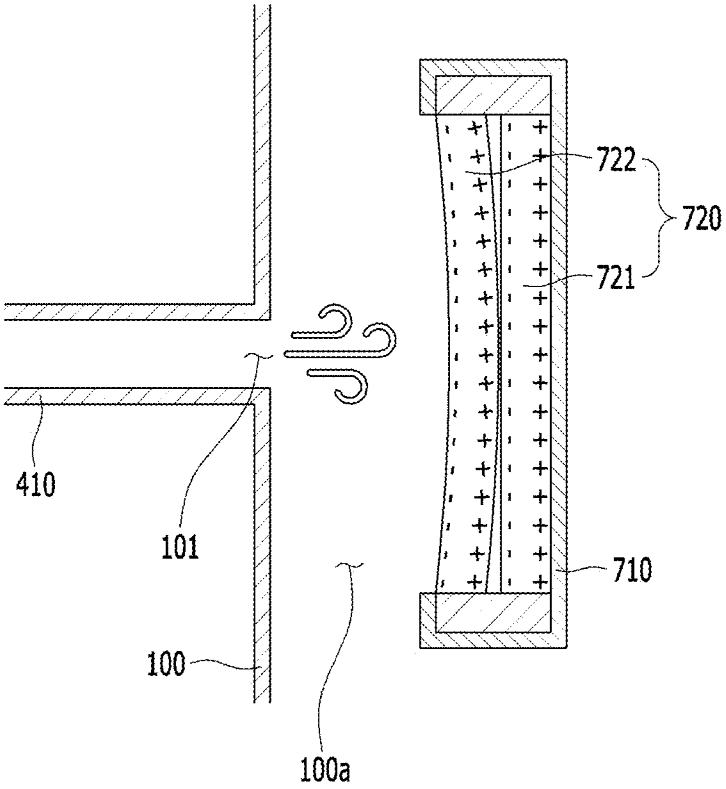
FIG. 7 illustrates the principle of power generation by the power generation unit of FIG. 4.

FIG. 6 illustrates a magnified view of the power generation unit shown in FIG. 4, and FIG. 7 illustrates the principle of power generation by the power generation unit of FIG. 4. Referring to FIGS. 6 and 7, the power generation unit 700 may include a collision plate 710 and a piezoelectric element 720.

The collision plate 710 may be arranged to face a steam injection port 101 of the steam curing tank 100 within the steam curing space 100*a*. The piezoelectric element 720 may be installed to be exposed to the opposing face of the steam inlet 101 of the collision plate 710. Therefore, the piezoelectric element 720 can produce electricity using the pressure of the steam when steam is injected through the steam inlet 101.

The piezoelectric element 720 may be an element of the Tribo-Electric Generator (TEG) method. For instance, the piezoelectric element 720 may include a fixed plate 721 disposed on a surface of the collision plate 710 and a movable plate 722 installed at a predetermined gap outside the fixed plate 721 to come into repeated contact with an outer face of the fixed plate 721 by steam pressure. As a result, current may be generated by a difference in charge between the fixed plate 721 and the movable plate 722, and the generated charge may be directly used for driving and controlling the shuttering magnets 520, 620 or stored in a battery.

The Tribo-Electric Generator (TEG) method is described in detail KR Patent Publication No. 10-2085295, which may be incorporated herein by reference. Nonetheless, the present disclosure is not limited thereto, and various other types of piezoelectric elements may be used.

Figure 8:
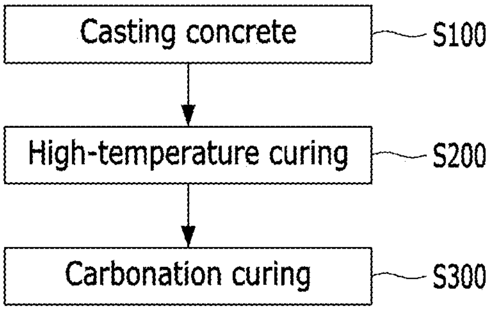
FIG. 8 is a flow diagram illustrating a method of steam curing and carbonation curing precast concrete in accordance with yet another embodiment of the present disclosure.

FIG. 8 is a flow diagram illustrating a method of steam curing and carbonation curing precast concrete in accordance with yet another embodiment of the present disclosure. Referring to FIG. 8, the method of steam curing and carbonation curing precast concrete in accordance with yet another embodiment of the present disclosure may include steps of casting concrete (S100), high-temperature curing (S200) and carbonation curing (S300).

Firstly, pre-prepared concrete may be poured into the concrete shaping space 300*a* of the mold 300 (S100). Particularly, in the case where the carbonation curing tank 200 includes the container 210 and the lid 220 and the plurality of segments 310, 320 include the plurality of first segments 310, which are coupled to the container 210, and the second segment 320, which is coupled to the lid 220, the concrete may be poured through the top surface of the concrete shaping space 300*a*, which is being opened when the lid 220 is separated from the container 210. In such a case, the concrete casting task may be undertaken by a worker or a concrete casting device being deployed into the steam curing tank 100. Moreover, the pressurizing device 600 may be activated during the concrete casting task to prevent the concrete shaping space 300*a* from arbitrarily being opened by the concrete casting pressure. Meanwhile, the lid 220 may be re-coupled to the container 210 once the concrete casting task is completed.

Next, the carbonation curing tank 200 enveloping the mold 300 may be heated to initiate high-temperature curing (S200). Here, the high-temperature curing may include steam curing, but the high-temperature curing is not necessarily limited to the steam curing and may include curing methods utilizing other heating means such as a heater. For instance, in the case of steam curing, steam may be injected into the steam curing space 100*a* of the steam curing tank 100. In such a case, the power generation unit 700 may generate electricity using the pressure of the steam being injected into the steam curing space 100*a*, and the generated electricity may be stored in a batter for use in driving and controlling the demolding device 500 and/or the pressurizing device 600.

Next, the mold 300 may be removed, and carbon dioxide may be injected into the carbonation curing tank 200 to initiate carbonation curing (S300). That is, concrete shaping and curing may all take place in situ without moving the product. While the mold 300 may be removed manually, the present disclosure is not limited to manual removal of the mold 300, and the removal of the mold 300 may be automated by the demolding device 500. In particular, carbonation curing may be initiated when a predetermined time has elapsed after initiating the high-temperature curing, wherein the predetermined time is a time sufficient to develop a minimum strength for retaining the shape in precast concrete C.

As such, the elapsed time between the start of the high-temperature curing and the start of the carbonation curing may be set to an optimized value based on repeated tests and may be set to be shorter than the duration of the high-temperature curing. Therefore, in at least the initial stages of carbonation curing, high-temperature curing and carbonation curing may take place simultaneously.

Meanwhile, in the present disclosure, the steam curing time may be 12 to 24 hours, and the carbonation curing time may be within 28 days, depending on the mixing ratio of the concrete. Moreover, the carbon dioxide concentration required for carbonation curing may be within 30% and may vary depending on the mixing ratio of the concrete.

As described above, the method of steam curing and carbonation curing precast concrete in accordance with yet another embodiment of the present disclosure may be performed using, but not limited to, the system 10 for steam curing and carbonation curing precast concrete in accordance with an embodiment or another embodiment of the present disclosure.

Hitherto, while certain preferred embodiments of the present disclosure have been described, the described embodiments are presented for illustrative purposes only and are not intended to limit the present disclosure thereto. Any one of ordinary skill in the art to which the present disclosure pertains shall appreciate that any variety of permutations and/or modifications of the described embodiments are possible, without departing from the technical ideas of the present disclosure described in the appended claims, by supplementing, modifying, deleting or adding certain elements, and that such permutations and/or modifications are included in the claims of the present disclosure.

| <Description of Elements> |
|---|
| 10: system |
| 100: steam curing tank |
| 100a: steam curing space |
| 101: steam inlet |
| 200: carbonation curing tank |
| 200a: carbonation curing space |
| 201: guide rail |
| 202: stopper |
| 210: container |
| 211: carbon dioxide inlet |
| 212: power cable socket |
| 220: lid |
| 300: mold |
| 300a: concrete shaping space |
| 310: first segment |
| 311: first stopper projection |
| 320: second segment |
| 321: second stopper projection |
| 330: platform |
| 331: insertion groove |
| 400: boiler |
| 410: steam injection unit |
| 420: carbon dioxide injection unit |
| 421: exhaust pipe |
| 422: carbon dioxide collector |
| 423: carbon dioxide storage tank |
| 424: carbon dioxide supply pipe |
| 425: carbon dioxide recovery line |
| 500: demolding device |
| 510: first magnet |
| 520: first shuttering magnet |
| 600: pressurizing device |
| 610: second magnet |
| 620: second shuttering magnet |
| 700: power generation unit |
| 710: collision plate |
| 720: piezoelectric element |
| 721: fixed plate |
| 722: movable plate |
| 800: control unit |

What is claimed is:

1. A system for steam curing and carbonation curing precast concrete, the system comprising:

a steam curing tank forming a steam curing space;

a carbonation curing tank disposed within the steam curing space and forming a carbonation curing space;

a mold disposed within the carbonation curing space and forming a concrete shaping space by a plurality of segments; and a demolding device configured to separate the plurality of segments from one another to open the concrete shaping space, wherein the plurality of segments form a gap through which carbon dioxide injected into the carbonation curing space flows into the concrete shaping space as each of the plurality of segments is pulled toward an inner surface of the carbonation curing tank by the demolding device, and wherein the demolding device comprises:

a first magnet being coupled, respectively, to the plurality of segments; and a first shuttering magnet being coupled to the carbonation curing tank and generating a magnetic force of opposite polarity to the first magnet.

2. The system according to claim 1, further comprising a pressurizing device configured to press each of the plurality of segments in a direction away from the inner surface of the carbonation curing tank to prevent the concrete shaping space from arbitrarily being opened due to the plurality of segments being pushed towards the inner surface of the carbonation curing tank by a concrete casting pressure, wherein the pressurizing device comprises:

a second magnet being coupled, respectively, to the plurality of segments; and a second shuttering magnet being coupled to the carbonation curing tank and generating a magnetic force of the same polarity as the second magnet.

3. The system according to claim 2, further comprising a power generation unit configured to supply power required for driving the demolding device and the pressurizing device, wherein the power generation unit is configured to generate power using the pressure of steam injected into the steam curing space.

4. The system according to claim 3, wherein the power generation unit comprises:

a collision plate facing a steam injection port within the steam curing space; and a piezoelectric element arranged on the collision plate.

5. The system according to claim 1, further comprising:

a boiler;

a steam injection unit configured to inject steam produced by the boiler into the steam curing space; and a carbon dioxide injection unit configured to inject carbon dioxide into the carbonation curing space.

6. The system according to claim 5, wherein the carbon dioxide injection unit comprises:

a carbon dioxide collector configured to separate carbon dioxide from the exhaust gas of the boiler; and a carbon dioxide storage tank configured to temporarily store carbon dioxide separated from the carbon dioxide collector.

7. The system according to claim 6, wherein carbon dioxide injection unit further comprises a carbon dioxide recovery line configured to recover carbon dioxide from the carbonation curing tank and store the recovered carbon dioxide in the carbon dioxide storage tank.

8. The system according to claim 5, further comprising a control unit configured to control the demolding device, the steam injection unit and the carbon dioxide injection unit, wherein the control unit is configured to drive the steam injection unit to initiate steam curing and then drive the demolding device and the carbon dioxide injection unit to initiate carbonation curing.

9. The system according to claim 8, wherein the control unit is configured to initiate carbonation curing after a predetermined time has elapsed after initiating steam curing, the predetermined time being a time sufficient to develop a minimum strength for retaining the shape in precast concrete.

10. The system according to claim 1, wherein the carbonation curing tank comprises a container and a lid configured to open and close an opened top surface of the container, and wherein the plurality of segments comprises: a plurality of first segments coupled to the container and configured to partition lateral surfaces of the concrete shaping space; and a second segment coupled to the lid and configured to partition a top surface of the concrete shaping space.

11. The system according to claim 10, wherein the mold further comprises a platform disposed on a bottom surface of the container to partition a bottom surface of the concrete shaping space.

12. The system according to claim 11, wherein the first segments is provided with first stopper projections at lower ends of the first segments, the first stopper projections being inserted into insertion grooves formed on a lateral surface of the platform.

13. The system according to claim 10, wherein the second segment is provided with second stopper projections along edges of the second segment, the second stopper projections being configured to support outer surfaces of the first segments.

14. The system according to claim 1, wherein the plurality of segments are each movably coupled to the carbonation curing tank via a buffer spring.

15. A method of steam curing and carbonation curing precast concrete, the method comprising:

casting pre-prepared concrete into a mold;

initiating high-temperature curing by heating a carbonation curing tank enveloping the mold; and initiating carbonation curing by removing the mold and injecting carbon dioxide into the carbonation curing tank, wherein the mold comprises a plurality of segments forming a concrete shaping space in the carbonation curing tank, wherein the plurality of segments is separated from one another by a demolding device to open the concrete shaping space, and wherein the demolding device comprises first magnets being coupled, respectively, to the plurality of segments and a first shuttering magnet coupled to the carbonation curing tank and configured to generate a magnetic force opposite to a polarity of the first magnets.

16. The method according to claim 15, wherein, in the step of initiating carbonation curing, carbonation curing is initiated when a predetermined time has elapsed after initiating the high-temperature curing, the predetermined time being a time sufficient to develop a minimum strength for retaining the shape in precast concrete.

17. The method according to claim 15, wherein the carbonation curing tank comprises a container and a lid configured to open and close an opened top surface of the container, wherein the plurality of segments comprises a plurality of first segments coupled to the container and configured to partition lateral surfaces of the concrete shaping space and a second segment coupled to the lid and configured to partition a top surface of the concrete shaping space, and wherein, in the step of casting pre-prepared concrete, the concrete is cast into the concrete shaping space through a top surface of the concrete shaping space being opened by separating the lid from the container.

* * * * *